United States Patent
Chand et al.

(10) Patent No.: US 11,079,260 B2
(45) Date of Patent: Aug. 3, 2021

(54) PIPE CROSS-SECTIONAL FIBER OPTIC MULTIPHASE APPARATUS

(71) Applicant: Saudi Arabian Oil Company, Dhahran (SA)

(72) Inventors: Karam Chand, Dhahran (SA); Frode Hveding, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 15 days.

(21) Appl. No.: 16/452,153

(22) Filed: Jun. 25, 2019

(65) Prior Publication Data

US 2020/0408573 A1   Dec. 31, 2020

(51) Int. Cl.
*G01F 1/34* (2006.01)
*G01F 1/74* (2006.01)
*G01D 5/353* (2006.01)

(52) U.S. Cl.
CPC .......... *G01D 5/35364* (2013.01); *G01F 1/34* (2013.01); *G01F 1/74* (2013.01)

(58) Field of Classification Search
CPC ......... G01D 5/35364; G01F 1/34; G01F 1/74; G01B 11/16
See application file for complete search history.

(56) References Cited

U.S. PATENT DOCUMENTS

| | | | |
|---|---|---|---|
| 988,523 A | 4/1911 | Toles | |
| 6,601,458 B1 | 8/2003 | Gysling et al. | |
| 6,785,004 B2 | 8/2004 | Kersey et al. | |
| 7,355,163 B2* | 4/2008 | Watley | G01M 5/0091 250/227.14 |
| 9,541,426 B2 | 1/2017 | Farhadiroushan et al. | |
| 2006/0164344 A1 | 7/2006 | Fish | |
| 2009/0008536 A1 | 1/2009 | Hartog et al. | |
| 2009/0273775 A1* | 11/2009 | Ukira | G01M 11/3172 356/73.1 |
| 2011/0090496 A1 | 4/2011 | Samson et al. | |
| 2014/0260588 A1 | 9/2014 | Jaaskelainen et al. | |
| 2015/0177042 A1* | 6/2015 | Song | G01F 1/662 73/861.04 |

(Continued)

OTHER PUBLICATIONS

Bhatia, "Applications of long-period gratings to single and multi-parameter sensing," Optics Express, vol. 4, issue 11, pp. 457-466, May 1999. 9 pages.

(Continued)

*Primary Examiner* — Maurice C Smith
(74) *Attorney, Agent, or Firm* — Fish & Richardson P.C.

(57) ABSTRACT

Systems, methods, and apparatuses for detecting components of a multiphasic flow are disclosed. A flowmeter may include a plurality of optical fibers disposed across a fluid flow. The optical fibers may generate backscattering of a portion of a laser beam transmitted along the optical fibers. The backscattering may be produced by a grating formed by zinc dicyanoaurate formed in each of the optical fibers. Heterodyne detection may be used to determine a Brillouin frequency shift that is used to determine strain and temperature measurements at different locations along the optical fibers. Artificial Intelligence uses the strain and temperature measurements to determine a flow regime of the fluid flow and flow rates of components forming the fluid flow.

20 Claims, 5 Drawing Sheets

(56) References Cited

U.S. PATENT DOCUMENTS

| | | | |
|---|---|---|---|
| 2015/0377667 A1* | 12/2015 | Ahmad | G01N 29/14 |
| | | | 702/48 |
| 2016/0165344 A1 | 6/2016 | Benattar | |
| 2017/0175465 A1 | 6/2017 | Dickenson et al. | |
| 2018/0094987 A1* | 4/2018 | Iwamura | G01K 11/32 |
| 2018/0266240 A1 | 9/2018 | Jaaskelainen et al. | |
| 2019/0063960 A1 | 2/2019 | Ramos et al. | |
| 2019/0094049 A1* | 3/2019 | Iwamura | G01D 5/35364 |

OTHER PUBLICATIONS

Baroncini et al., "Single- and Two-Phase Flow Characterization using Optical Fiber Bragg Gratings," Sensors vol. 15, Mar. 2015, 11 pages.

Zamarreno et al., "Single and Multiphase Flow Characterization by Means of an Optical Fiber Bragg Grating Grid," Journal of Lightwave Technology, vol. 33, Issue 9, May 2015, 6 pages.

PCT Invitation to Pay Fees and, Where Applicable, Protest Fee in International Appln. No. PCT/US2020/039497, dated Oct. 9, 2020, 14 pages.

PCT International Search Report and Written Opinion in International Appln. No. PCT/US2020/039497, dated Feb. 12, 2021, 24 pages.

* cited by examiner

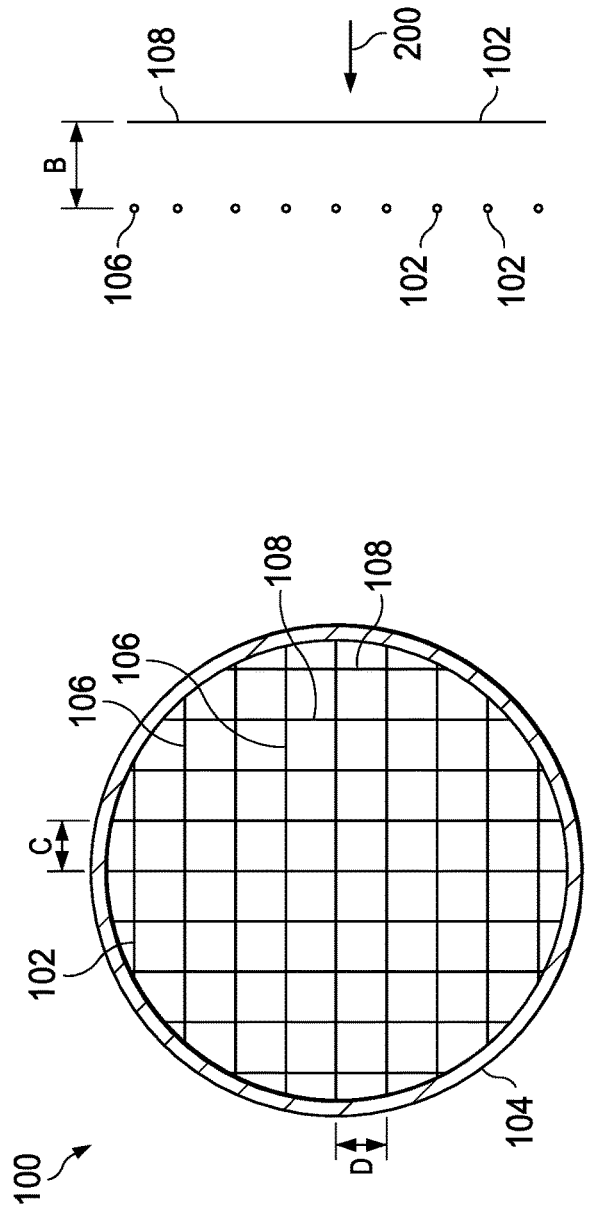
FIG. 1
FIG. 2
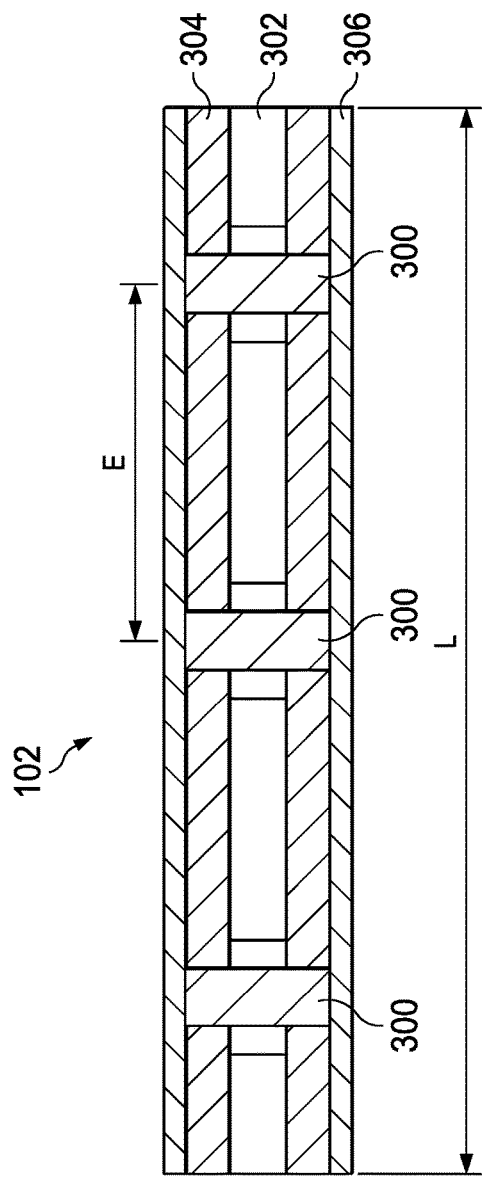
FIG. 3

PIPE CROSS-SECTIONAL FIBER OPTIC MULTIPHASE APPARATUS

TECHNICAL FIELD

The present disclosure relates to determining flow parameters.

BACKGROUND

In oil and gas production, fluid flows having multiple components or phases exist and include fluid flows having three phases, which are gas, oil, and water. It is desirable to determine flow parameters of such multiphasic fluid flows. It is important to measure these flow parameters of a multiphasic flow produced form a reservoir in order to control and regulate the production process in an effective manner. The ability to measure flow rates of the individual components of the fluid flow during hydrocarbon production has value to the oil and gas industry.

SUMMARY

A first aspect of the present disclosure is directed to a system for sensing strain and temperature at different locations along an optical fiber using a Brillouin frequency shift. The system may include a flowmeter that includes a plurality of optical fibers. The optical fibers may include a core and a grating formed of zinc dicyanoaurate distributed within the core. The system may also include a continuous wave laser operable to generate a laser beam. The laser beam may enter a first end of the optical fibers, and the laser beam may be scattered to create a Brillouin scattered wave from a portion of the laser beam. The system may also include a heterodyne detector that compares the Brillouin scattered wave to a local oscillator to generate a Brillouin frequency shift, and an artificial intelligence system operable to determine volumetric flow rates of a fluid flow passing through the flow meter based on the Brillouin frequency shift.

A second aspect of the present disclosure is directed to a computer implemented method performed by one or more processors for automatically detecting flow rates for different components of a fluid flow. The method may include receiving a Brillouin scattering wave from at least one optical fiber extending into a fluid flow; determining a Brillouin frequency shift using heterodyne detection; determining strain and temperature values at one or more locations along the optical fiber; determining a flow regime of the fluid flow using a flow regime observer; and determining the different components of the fluid flow using a quantifier based on the determined strain and temperature values and the determined flow regime.

Another aspect of the present disclosure is directed to an apparatus for automatically detecting flow rates for different components of a fluid flow. The apparatus may include one or more processors and a non-transitory computer-readable storage medium coupled to the one or more processors and storing programming instructions for execution by the one or more processors. The programming instructions may instruct the one or more processors to generate a laser beam with a continuous wave laser; generate a local oscillator signal from a portion of the laser beam with an electro-optic modulator; detect a Brillouin frequency shift with a photodiode according to heterodyne detection, based on a comparison of a Brillouin scattered wave and the local oscillator signal; determine strain and temperature values at one or more locations along the optical fiber using one or more interrogators; determine a flow regime of the fluid flow using a flow regime observer; and determine the different components of the fluid flow using a quantifier based on the determined strain and temperature values and the determined flow regime.

The various aspects may include one or more of the following features. At least one interrogator may be operable to determine a strain and measurement at one or more locations along a length of the optical fibers from the Brillouin frequency shift. A Kalman filter may be operable to smooth the determined strain and temperature measurements. A quantifier may be operable to determine volumetric flow rates of components of a fluid flow passing through the flowmeter. The plurality of optical fibers may include a first set of parallel optical fibers extending perpendicularly to a flow direction of the fluid flow. The plurality of optical fibers may include a second set of parallel optical fibers disposed perpendicularly to the flow direction of the fluid flow and perpendicularly to the first set of parallel optical fibers. The first set of parallel optical fibers may be displaced from the second set of parallel optical fibers in a direction of the fluid flow. The heterodyne detector may include a first photodiode and a second photodiode and a summation amplifier operable to determine a phase shift between the local oscillator and the Brillouin scattered wave.

The various aspects may also include one or more of the following features. Receiving a Brillouin scattering wave from at least one optical fiber extending into a fluid flow may include receiving backscattering from a laser beam transmitted along the optical fiber, the backscattering produced by a grating formed by zinc dicyanoaurate in the optical fiber. Determining a Brillouin frequency shift using heterodyne detection may include comparing a local oscillator signal to the Brillouin scattered wave using a first photodiode. Determining a Brillouin frequency shift using heterodyne detection may include comparing the local oscillator signal to the Brillouin scattered wave using a second photodiode and summing a first electrical signal from the first photodiode and a second electoral signal from the second photodiode using a summation amplifier. Determining strain and temperature values at one or more locations along the optical fiber may include correlating the Brillouin frequency shift with a position along the optical fiber to determine the stress and temperature values at the position along the optical fiber. A portion of the laser beam may be directed through an electro-optic modulator, and the electro-optic modulator may be controlled with a microwave signal generator to generate the local oscillator having a frequency corresponding to a frequency generated by the microwave signal generator.

The various aspects may further include one or more of the following features. The Brillouin scattered wave may include backscattering from a portion of the laser beam transmitted along an optical fiber exposed to the fluid flow, the backscattering produced by a grating formed by zinc dicyanoaurate in the optical fiber. A flowmeter may include a plurality of optical fibers extending across a fluid flow. At least a portion of the optical fibers may be disposed parallel to each other and perpendicularly to a direction of the fluid flow. Programming instructions may instruct the one or more processors to compare the local oscillator signal to the Brillouin scattered wave using a second photodiode and to sum a first electrical signal from the first photodiode and a second electoral signal from the second photodiode using a summation amplifier. Programming instructions that instruct the one or more processors to detect a Brillouin frequency shift with a photodiode according to heterodyne detection based on a comparison of a Brillouin scattered wave and the local oscillator signal may include programming instructions that instruct the one or more processors to: compare the Brillouin scattered wave and the local oscillator signal with a first photodiode; compare the Brillouin scattered wave and the local oscillator signal with a second photodiode; and sum a first electrical signal from the first photodiode and a second electrical signal from the second photodiode with a summation amplifier. Programming instructions that instruct the one or more processors to determine strain and temperature values at one or more locations along the optical fiber using one or more interrogators circuits may include programming instructions that instruct the one or more processors to correlate the Brillouin frequency shift with a position along the optical fiber to determine the stress and temperature values at the position along the optical fiber. Programming instructions may instruct the one or more processors to smooth the determined strain and temperature values using one or more Kalman filters. The programming instructions that instruct the one or more processors to determine a flow regime of the fluid flow using a flow regime observer may include programming instructions that instruct the one or more processors to determine the flow regime using artificial intelligence.

The details of one or more embodiments of the present disclosure are set forth in the accompanying drawings and the description to follow. Other features, objects, and advantages of the present disclosure will be apparent from the description and drawings, and from the claims.

DESCRIPTION OF DRAWINGS

FIG. 1 is a schematic diagram of an example distributed optical fiber flow meter, according to some implementations of the present disclosure.

FIG. 2 is a schematic is a side view of the flow meter of FIG. 1 with the conduit omitted, according to some implementations of the present disclosure.

FIG. 3 is a schematic view of a portion of an example optical fiber with an arrangement of the zinc dicyanoaurate particles within the optical fiber, according to some implementations of the present disclosure.

DETAILED DESCRIPTION

Figure 4:
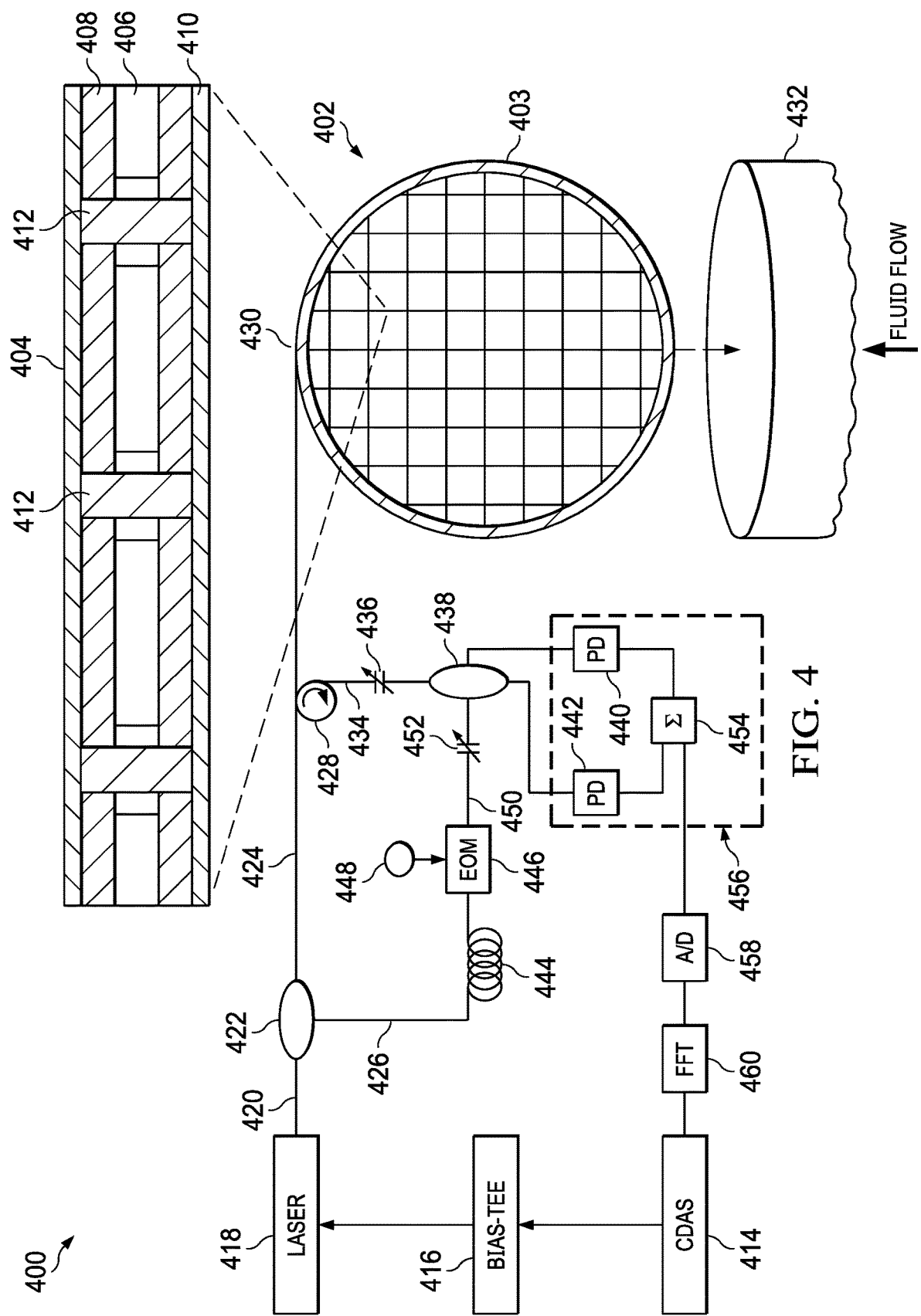
FIG. 4 is a schematic diagram of an example distributed measurement system for simultaneously measuring strain and temperature at different locations along an optical fiber, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, steps, or a combination of these described with respect to one implementation may be combined with the features, components, steps, or a combination of these described with respect to other implementations of the present disclosure.

Physical principles linking strain and temperature measurements of a fluid flow to flow rates, viscosity, and surface roughness are well known. A rate of change in strain in a flow measurement element caused by a fluid flow is related to pressure drop and is primarily due to viscous losses. This rate of change in strain has a direct relationship to flow rate and composition. Additionally, temperature gradients within a fluid flow are directly related to the heat capacity of the fluid. The present disclosure is directed to systems, methods, and apparatuses that utilize these physical principles and measure strain and temperature to determine flow parameters of a fluid flow, particularly a multiphasic fluid flow.

FIG. 1 is a front view of an example flow meter 100 within the scope of the present disclosure. The flow meter 100 includes a plurality of optical fibers 102 extending across a cross section of a conduit 104, such as a pipe. The conduit 104 may have a circular cross-sectional shape. However, the conduit 104 may have a cross-sectional shape that is other than circular. The plurality of optical fiber 102 may be utilized in a conduit having any cross-sectional shape and maintain the ability to function as a flow meter. The flow meter 100 is adapted to be disposed in a conduit having a circular cross-sectional shape or a cross-sectional shape other than circular.

As shown in FIG. 1, the plurality of optical fibers 102 are distributed over a cross-section of the conduit 104. In the illustrated example, the optical fibers 102 are coupled directly to the conduit 104. In the illustrated example, the plurality of optical fibers 102 include a first set of parallel optical fibers 106 and a second set of parallel optical fibers 108 having an orientation perpendicular to the first set of parallel optical fibers 106. In some implementations, the flow meter 100 may include a peripheral ring to which the optical fibers 102 attach. The peripheral ring may be sized to have an internal size and shape that corresponds to a size and shape of a conduit into which the flow meter 100 is installed.

FIG. 2 is a side view of the flow meter 100 with the conduit 104 omitted. As shown, the first set of parallel optical fibers 106 and the second set of parallel optical fibers 108 are displaced from each other by a distance B along a flow direction 200. Additionally, the plurality of optical fibers 102 are oriented perpendicularly to the flow direction 200. The distance B may be selected such that displacement of one or more optical fibers 102 of the first set of parallel optical fibers 106 does not interfere with or contact optical fibers 102 of the second set of parallel optical fibers 108. For example, in some implementations, the distance B may be within a range of one to ten millimeters. In other implementations, the distance B may be greater than ten millimeters. In some implementations, a flow sensor within the scope of the present disclosure may include one of the first set of parallel optical fibers 106 or the second set of parallel optical fibers 108 to the exclusion of the other.

As shown in FIG. 1, a spacing C between adjacent optical fibers 102 of the first set of parallel optical fibers 106 and a spacing D between adjacent optical fibers 102 of the second set of parallel optical fibers 108 may vary depending upon, for example, the cross-sectional size of the conduit. For example, for a conduit 104 having a reduced cross-sectional size, closer spacings C and D may be used. For a conduit 104 having an enlarged cross-sectional size, wider spacings C and D may be used. In some implementation, the spacings C and D may be identical. In other implementations, the spacings C and D may be different.

The optical fibers 102 includes zine dicyanoaurate that is contained within the material forming the optical fiber 102 and distributed along a length of the optical fiber 102. In some implementations, the zinc dicyanoaurate is distributed over an entire length of the optical fibers 102 exposed to the fluid flow. The zinc dicyanoaurate is distributed in the optical fiber 102 in a regular pattern along the length of the optical fiber 102. Zinc dicyanoaurate is a negative compressibility and transparent material (NCTM) that expands in at least one direction when compressed. With the optical fibers 102 extending across a cross-section of the conduit 104, the optical fibers 102 encounter strain due to deflection and change temperature in response to the fluid flow. More particularly, where the flow is a multiphasic flow, the temperatures and strain may vary along a length of the optical fibers 102 as a result of the different phases present in a fluid flow. As a result, the optical fibers 102 are operable to sense strain and temperature information at different locations along the length of the optical fibers 102. Moreover, the optical fibers 102 form an array of strain and temperature sensors, and each of the optical fibers 102 is operable to provide signals indicative of temperature and strain at different locations along the length of the optical fibers 102. Therefore, with the array of optical fibers 102, temperature and strain measurements are obtained at particular locations along a cross-section of the conduit 104 and, hence, the fluid flow.

As a result of the NCTM property of zinc dicyanoaurate, when the optical fibers 102 bend, such as strain due to drag caused by a fluid flow, the zinc dicyanoaurate expands, resulting in spontaneous Brillouin scattering of an optical beam passing along the optical fibers 102. This Brillouin scattering results in part of the light being reflected back along the optical fiber 102 and alters a Brillouin frequency of the reflected light. As a result, the optical fibers 102 are operable to provide signals indicative of both strain and temperature simultaneously, at different locations along the optical fibers 102. Additionally, the NCTM property of the zinc dicyanoaurate improves resolution and sensitivity of the sensed measurements.

FIG. 3 is a schematic view of a portion of an example optical fiber 102 with an arrangement of the zinc dicyanoaurate particles 300 within the optical fiber 102. As shown, the optical fiber 102 includes a core 302, a cladding 304, and an outer coating 306. The zinc dicyanoaurate particles 300 are disposed in the core 302 and have a regular, periodic distribution along a length, L, of the optical fiber 102, creating a periodic modulation of the refractive index of the core 302 along the length of the optical fiber 102. As a result, the zinc dicyanoaurate forms a grating within the optical fiber 102. The zinc dicyanoaurate particles 300 may be separated from adjacent zinc dicyanoaurate particles 300 by a distance E within a range of 0.2 millimeters (mm) and 20 mm. As a result of this distribution, the optical fibers 102 have a structure that, subject to compression, is operable to reflect light and produce a frequency shift in the reflected light that is indicative of strain and temperature.

The optical fibers 102 sense strain and temperature using Brillouin optical correlation domain reflectometry (BOCDR). A laser beam is injected into a single end of an optical fiber. Spontaneous Brillouin scattering and interference control of a continuous laser are used to determine temperature and strain experience at different locations along the optical fiber. BOCDR provides a spatial resolution and a sampling rate to determine strain and temperature readings along the optical fibers 102. In BOCDR, laser light is introduced into the optical fibers 102 and backscattering (or Brillouin scatting in the reflected laser light) is measured for temperature and strain measurements. The Brillouin scattering provides spatial resolution of the reflected light and, consequently, provides for simultaneous strain and temperature measurements. BOCDR uses a combination of spontaneous Brillouin scattering and a correlation control of a continuous wave laser. The grating formed by the distribution of the zinc dicyanoaurate particles creates periodic changes in the refractive index of the core 302 of the optical fiber 102 in the direction of light propagation when the optical fiber 102 experiences compression, such as due to bending caused by a fluid flow. Heterodyne detection is used with the Brillouin scattering to isolate strain and temperature measurements at particular locations along an optical fiber 102.

FIG. 4 is a schematic diagram of an example distributed measurement system 400 for simultaneously measuring strain and temperature at different locations along an optical fiber. The system 400 forms an interrogator and performs BOCDR from single ends of each of optical fibers. System 400 includes a flow meter 402 that may be similar to the flow meter 100 described earlier. As shown, the flow meter 402 is disposed in a conduit 403. The flow meter 402 includes a plurality of optical fibers 404 that may be similar to the optical fibers 102. As shown, the flow meter 402 includes a plurality of optical fibers 404 having two sets of parallel optical fibers that are perpendicularly arranged to each other. However, as explained earlier, a single set of parallel optical fibers may be used. The optical fibers 404 include a core 406, a cladding 408, an outer coating 410 and zinc dicyanoaurate 412 distributed along a length of the optical fiber 404 to form a grating, as described earlier. Thus, when the optical fibers 404 encounter a fluid flow and bend as a result, the zinc dicyanoaurate expands, providing the Brillouin scattering.

The system 400 includes a controller and data acquisition system (CDAS) 414, a bias-tee 416 that the CDAS 414 uses to control laser light emitted by a continuous wave laser 418. The bias-tee 416 controls modulation of the optical wavelength of the laser beam generated by the laser 418 in a sinusoidal waveform by directly modulating the electrical current fed into the laser 418. Although the controller and data acquisition system 414 is illustrated as forming a single component, in other implementations, the controller and a data acquisition system may be separate components. The CDAS 414 may be or include a computer, data processing apparatus, or electronic computer device of any type. The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

Computers suitable for the execution of a computer program can be based on one or more of general and special purpose microprocessors and other kinds of CPUs. The elements of a computer that may be used as or as part of the CDAS 414 include a CPU for performing or executing instructions and one or more memory devices for storing instructions and data. Generally, a CPU can receive instructions and data from (and write data to) a memory. The data processing hardware can also include, or be operatively coupled to, one or more mass storage devices for storing data. In some implementations, the data processing hardware can receive data from, and transfer data to, the mass storage devices including, for example, magnetic, magneto optical disks, or optical disks. Moreover, the data processing hardware can be embedded in another device, for example, a desktop computer, a laptop computer, a mobile telephone, a personal digital assistant (PDA), a mobile audio or video player, a game console, a global positioning system (GPS) receiver, or a portable storage device such as a universal serial bus (USB) flash drive.

The data processing hardware may include or otherwise be coupled to computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry. The data processing hardware used in a control system includes hardware and software that is operable to cause the control system to operate as described, including, but not limited to, receiving signals from one or more pressure transduces; processing the received signals, such as by comparing the received signals to a predetermined value or values; and, in response to the signal processing, sending signals to cause other hardware to actuate, such as the actuation of an under-voltage relay to open or close a circuit breaker.

The CDAS 414, via the bias-tee 416 causes the laser 418 to generate a coherent laser beam that is transmitted through an optical fiber 420. The laser beam is split by a beam splitter 422. In the illustrated example, the beam splitter 422 is a 90/10 beam splitter in that 90 percent of the laser light is separated and transmitted along optical fiber 424 and 10 percent of the laser light is transmitted along optical fiber 426. The 90 percent component of the laser beam continues through a circulator 428 and into a first end 430 of one of the optical fiber 404. As a result of a fluid flow 432 passing through the conduit 403, the optical fibers 404 deflect to produce strain in response to temperatures and movement of the different components of the fluid flow 432.

As a result of the deflection of the optical fiber 404, the zinc dicyanoaurate contained within the optical fiber 404 is compressed, causing the zinc dicyanoaurate to expand in at least one direction. This expansion of the zinc dicyanoaurate causes Brillouin scattering of a portion of the 90 percent component of the laser beam back along the optical fiber 404. The reflected portion of the laser beam is conducted back to the circulator 428 and sent along optical fiber 434. The reflected portion of the laser beam encounters a filter 436 and thereafter encounters another beam splitter 438. The filter 436 operates to remove Rayleigh scattering from the laser beam. In the illustrated example, the beam splitter 438 is a 50/50 beam splitter in that 50 percent of the incoming laser light is transmitted to a first photodetector 440 and the remaining 50 percent of the incoming laser light is transmitted to a second photodetector 442.

The 10 percent portion of the laser beam transmitted along optical fiber 426 encounters a delay 444 that delays the laser beam by a desired amount of time compared to the portion of the laser beam entering the splitter 438. This 10 percent portion of the laser beam functions as a reference beam, and the reference beam is used to control an order of periodic correlation peaks. The light beam then enters an electro-optic modulator (EOM) 446. The EOM 446 utilizes a microwave signal generator 448 to generate a local oscillator (LO) that is used to compare the reflected laser light transmitted to the beam splitter 438 via optical fiber 434. In some implementations, a signal generated by the microwave may have a frequency of 10 gigahertz (GHz), although other frequencies may be used. Additionally, the microwave signal may have a sweep of +/−500 megahertz (MHz). The LO is used to measure the Brillouin frequency shift. The LO travels through an optical fiber 450 and a filter 452 and is transmitted into the beam splitter 438, where the LO is split. 50 percent of the LO is sent to first photodetector 440 and another 50 percent of the LO is sent to the second photodetector 442. The first and second photodetectors 440 and 442 along with summation amplifier 454 forms an optical heterodyne detector 456. Two photodetectors 440 and 442 are used as part of the heterodyne detection methodology. In some implementations, the heterodyne detector 456 may have a 2 GHz bandwidth. In other implementations, the heterodyne detector 456 may have a different bandwidth.

Each of the first and second photodetectors 440 and 442 receives a portion of the reflected laser beam and the LO. The photodetectors 440 and 442 generate electrical signal in response to the detected light, and those electrical signals are summed in the summation amplifier 454. Thus, the optical heterodyne detector 456 operates to determine a phase shift between the reflected laser beam and the LO to extract information encoded in the reflected laser.

By detecting the phase shift between the two light beams, the optical heterodyne detector 456 detects strain and temperature measurements associated with the fluid flow 432 passing through the conduit 403. The signal produced by the summation amplifier 454 is transmitted to an analog-to-digital (A/D) converter 458 and then through a Fast Fourier Transform (FFT) 460. In some implementations, the FFT 460 may be incorporated into, or otherwise form part of, the CDAS 414. For example, in some implementations, the FFT 460 may be a software application executed by one or more processors of the CDAS 414. In other implementations, the FFT 460 may be a separate component in communication with the CDAS 414. The CDAS 414 operates to use the electrical signals inputted from the FFT 460 and calculates the strain and temperature measurements at different locations along the length of the optical fibers 404. FIG. 4 illustrates the use of a single optical fiber 404 to obtain strain and temperature measurements associated with a fluid flow. In other implementations, additional or all of the optical fibers forming a flow meter may be used to obtain strain and temperature measurements associated with a fluid flow. For example, in other implementations, all of the optical fibers 404 of the flow meter 402 may be used as described earlier to determine strain and temperature measurements at different locations along each optical fiber 404.

Prior to the optical fibers 404 being disturbed, such as by engagement of the optical fibers 404 by the fluid flow 432, initial measurements of the Brillouin backscatter are made. The Brillouin backscatter, which is the laser light reflected by the zinc dicyanoaurate, is also referred to as a Brillouin scattered wave. The Brillouin scattered wave is shifted with respect to the LO by a frequency called the Brillouin frequency. The Brillouin frequency is determined by the heterodyne detector 456. The Brillouin frequency is related to the effective refractive index, vacuum wavelength of the initial laser beam, and the acoustic velocity in the core of the optical fiber. The acoustic wave depends on temperature and material density. These initial measurements are calibrated, and initial data at particular locations along the optical fibers 404 are captured. These initial data may be stored in the CDAS 414 or in a separate database.

These initial measurements represent an unstrained condition of the optical fibers 404. Thus, a Brillouin frequency is identified for a no-flow condition. When the fluid flow 432 engages the optical fibers 404, the Brillouin scattered wave is measured, and a new Brillouin frequency is determined at each location along the length of the optical fibers 404. The difference between the initially determined Brillouin scattered wave in the no-flow condition is compared to the Brillouin frequency associated with the fluid flow. The difference in these Brillouin frequencies represents a Brillouin frequency shift. The electrical signal produced by the optical heterodyne detector 456 represents this Brillouin frequency shift. This Brillouin frequency shift is an indication of the strain being experienced by the optical fiber 404 at the particular location of the measurement. Any change in the physical characteristics that impacts the acoustic velocity, such as strain and temperature, as represented in the Brillouin frequency shift, can be monitored.

Time averaging of a correlation (coherence) function is synthesized into a series of periodical peaks, whose period is inversely proportional to the frequency of the sinusoidal modulation. The correlation function is used to characterize statistical and coherence properties of the optical signals. A sinusoidal frequency of an alternating current input at the bias-tee is controlled to have a single correlation peak within a measurement fiber range. Therefore, Brillouin scattering that is generated at a particular position along the optical fiber 404 corresponds to a peak and correlates with the reference beam. This correlation is utilized by the photodetectors 440 and 442 along with the summation amplifier 456 to produce an output signal from the optical heterodyne detector 456.

Strain is determined as the Brillouin frequency shift, and the temperature is obtained from the change in magnitude of a Brillouin frequency shift spectrum. As mentioned earlier, a laser beam from the laser 418 is divided into a pump beam and a reference beam. The pump beam travels along the optical fiber 424, and the reference beam travels along optical fiber 426. The reference beam is used to generate the optical local oscillator (LO). The pump beam is injected into the optical fiber 404 and the Stokes response of the Brillouin scattering is diverted towards the heterodyne detector 456. As explained earlier, the heterodyne detector 456 includes two balanced photodiodes 440 and 442. A beat signal, determined by a comparison of the LO and the Stokes response of the Brillouin scattering, is measured with a spectrum analyzer. The CDAS 414, the A/D converter 458, and the FFT 460 combine to form the spectrum analyzer. In some implementations, a frequency of the beat signal is in the range of 10 GHz to 11 GHz. To resolve a position along the optical fiber 404, a current injected into the laser 418 is modulated with a sinusoidal waveform. Since time averaging is used in spectrum measurement, a correlation (coherence) function is synthesized into series of periodical peaks, whose period is inversely proportional to the frequency of the sinusoidal modulation signal. A handle on the sinusoidal modulation signal provides a single correlation peak. Therefore, the Brillouin scattering generated at a position corresponding to the peak correlates with the reference oscillator and therefore produces a heterodyne output. The peak frequency observed gives the Brillouin frequency shift due to changes at the particular position along the optical fiber 404. Therefore the correlation peak is scanned along the fiber 404 by sweeping the modulation signal to obtain the Brillouin gain spectrum or the Brillouin frequency shift.

Figure 5:
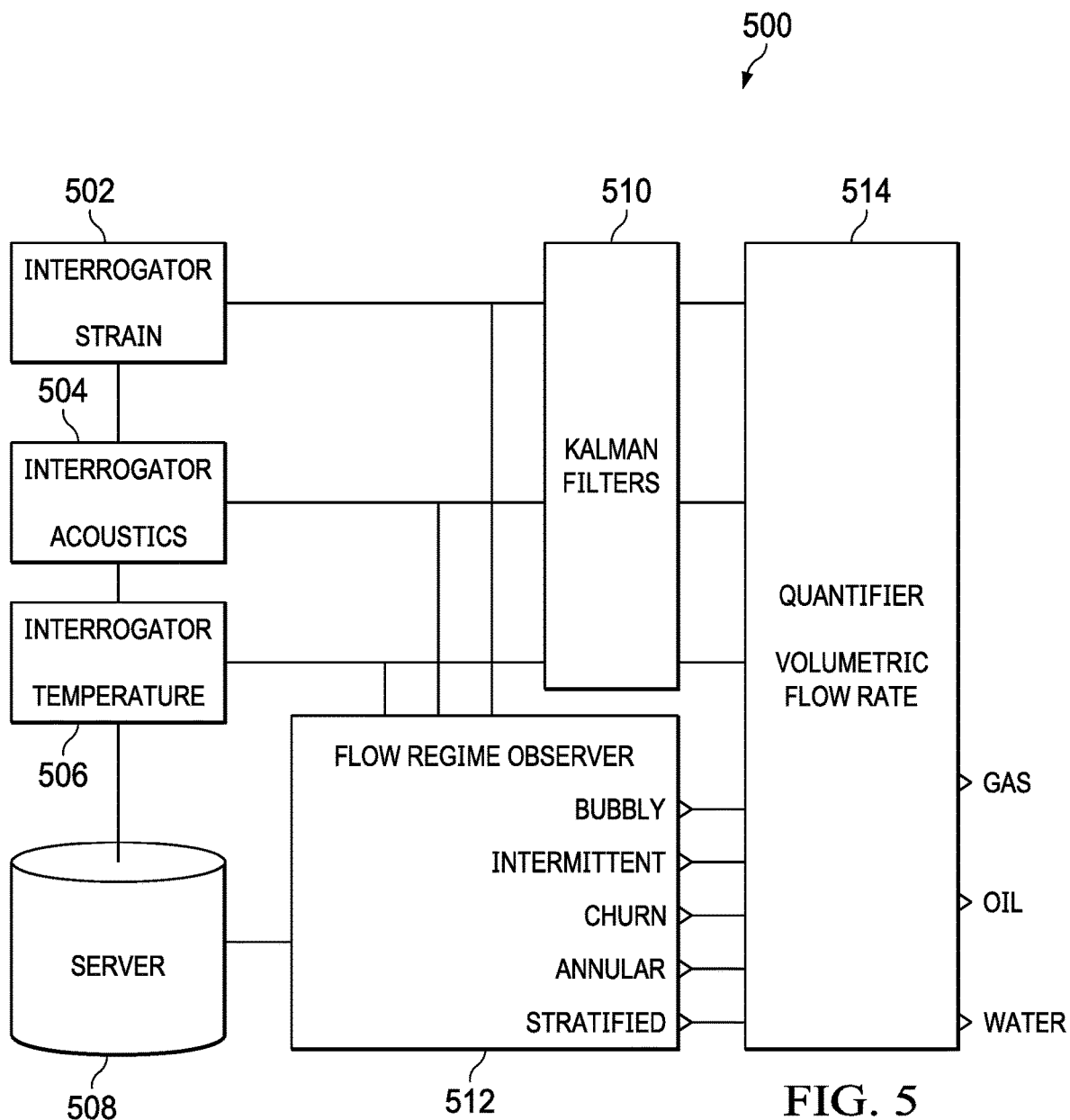
FIG. 5 is an example system for determining volumetric flow rates of different components of a multiphasic flow using artificial intelligence, according to some implementations of the present disclosure.

The electrical signals received by the CDAS 414 are stored as measurement data, such as in the CDAS 414 or another database. Referring to FIG. 5, these data are fed into interrogators 502, 504, and 506 of artificial intelligence (AI) system 500. The strain interrogator 502, the acoustics interrogator 504, and the temperature interrogator 506 receive and utilize the measurement data and respective algorithms to determine strain values, acoustical values, and temperature values, respectively, from the received measurement data.

These strain, acoustic, and temperature values are stored in a database 508 and are also transferred to Kalman Filters 510. Kalman filters 510 perform statistical evaluation of the measured values. The Kalman filters 510 operate to smooth data from noisy input data. The smoothed data from the Kalman filters 510 are sent to a flow regime observer (FRO) 512 and to a quantifier 514. The FRO 512 contains data, such as test data, associated with different flow regimes. Multiphasic flow is a fluid flow containing different material phases. For example, a multiphasic flow may include a liquid phase (including oil and water), a solid phase (such as solid particles of rock), and a gas phase (such as air or a hydrocarbon gas). Other multiphasic flows may include some of these material phases while omitting another. These different phases interact with one another during flow. Interfaces between the different phases of material are influenced by the motion of the respective phases. The motion of the different phases and the changing interfaces between the different phases create many different flow patterns. These flow patterns also depend on many other factors, such as phase flow rates, flow pressures, conduit diameter, and inclination of conduits carrying the multiphasic flow. For example, fluid flow directed vertically upwards (that is, against gravity), the fluid flow may have flow regimes are mainly bubbly, intermittent (slug) flow, churn (froth) flow, annular flow. In case of horizontal flow, the fluid flow may have a stratified flow regime.

The FRO 512 contains flow regime test data that includes flow data for fluid flows in different sized conduit, at different temperatures, and in different orientations. The FRO 512 also includes actual, non-test flow data measured as part of actual production fluid flows. The test data may include test data from prior tests with controlled conditions in order to generate particular flow regimes. With the use of artificial intelligence, the flow regimes from these tests describe geometric distributions of each phase of the multiphasic flow and how those geometric distributions vary depending on the flow velocities, fluid properties, and pipe orientation. The artificial intelligence involves development of algorithms that can learn from the data, such as learning patterns in data, and utilize the pattern recognition to automatically categorize input data into different flow regimes. This also includes learning to classify between different data sets and learning to predict data and results.

These data are then quantitatively categorized. For example, these fluid flow regimes are analyzed and categorized into the different flow regimes, such as bubbly, intermittent, churn, annular, and stratified. The measured values sent to the FRO 512 are processed, using artificial intelligence, and are combined with these existing flow regime data to add to and improve the resulting flow regime data.

These flow regime data from the FRO 512 and the smoothed measured values from the Kalman filters are sent to quantifier 514, where the data volumetric flow rates for each phase of the multiphasic flow are determined. The quantifier 514 uses quantification logic to identify the quantity of phases present in the measured data and output volumetric flow rates for the different phases. Particularly, the quantifier 514 determines a volumetric flow rate for gas, oil, and water that form a fluid flow, such as the fluid flow 432, encountered by a flow meter of the types described in the present disclosure, such as flow meters 100 and 402 described earlier.

Figure 6:
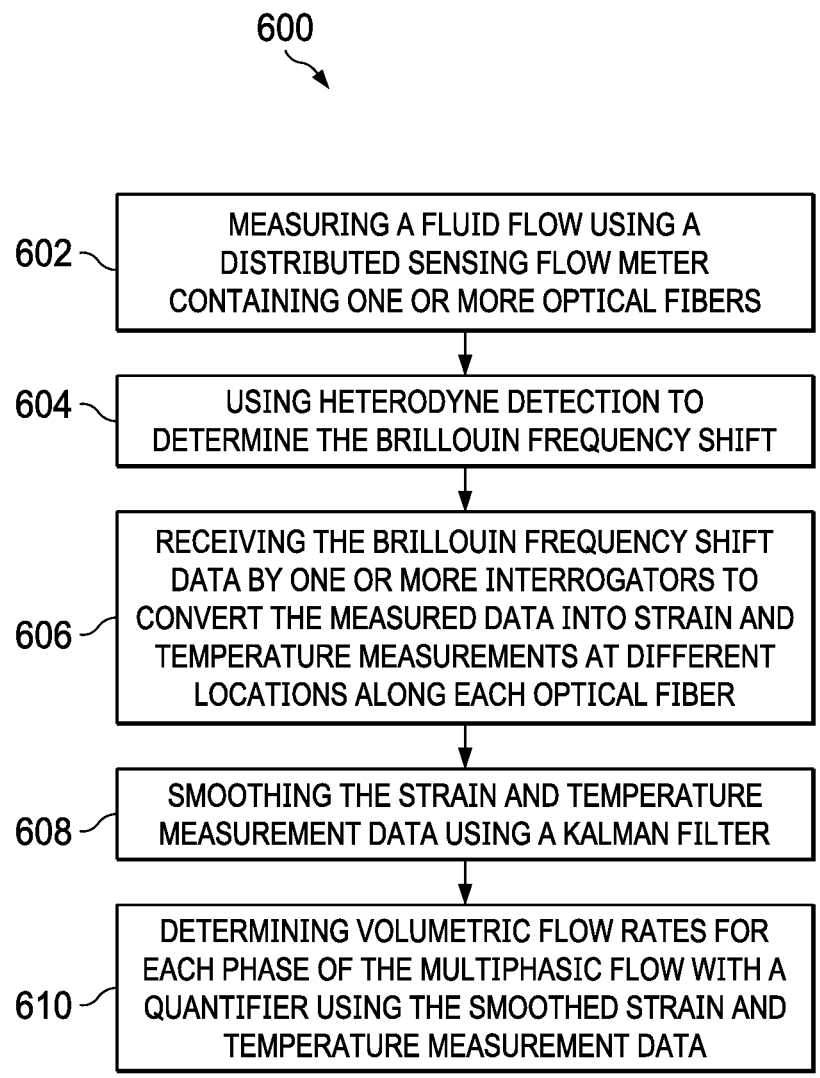
FIG. 6 is a flowchart for an example method of determining multiphasic flow rates for different components of a multiphasic fluid flow, according to some implementations of the present disclosure.

FIG. 6 is a flowchart of an example method 600 of determining flow rates of different components of a multiphasic fluid flow. At 602, a fluid flow is measured using a distributed sensing flow meter containing one or more optical fibers. The flow meter utilizes a Brillouin frequency shift to determining strain and temperature measurements at different locations along a length of each optical fiber. At 604, heterodyne detection is used to determine the Brillouin frequency shift. At 606, the Brillouin frequency shift data are received by one or more interrogators to convert the measured data into strain and temperature measurements at different locations along each optical fiber. At 608, the strain and temperature measurement data are smoothed using a Kalman filter. At 610, the smoothed strain and temperature measurement data are received by a quantifier where the data volumetric flow rates for each phase of the multiphasic flow are determined.

Figure 7:
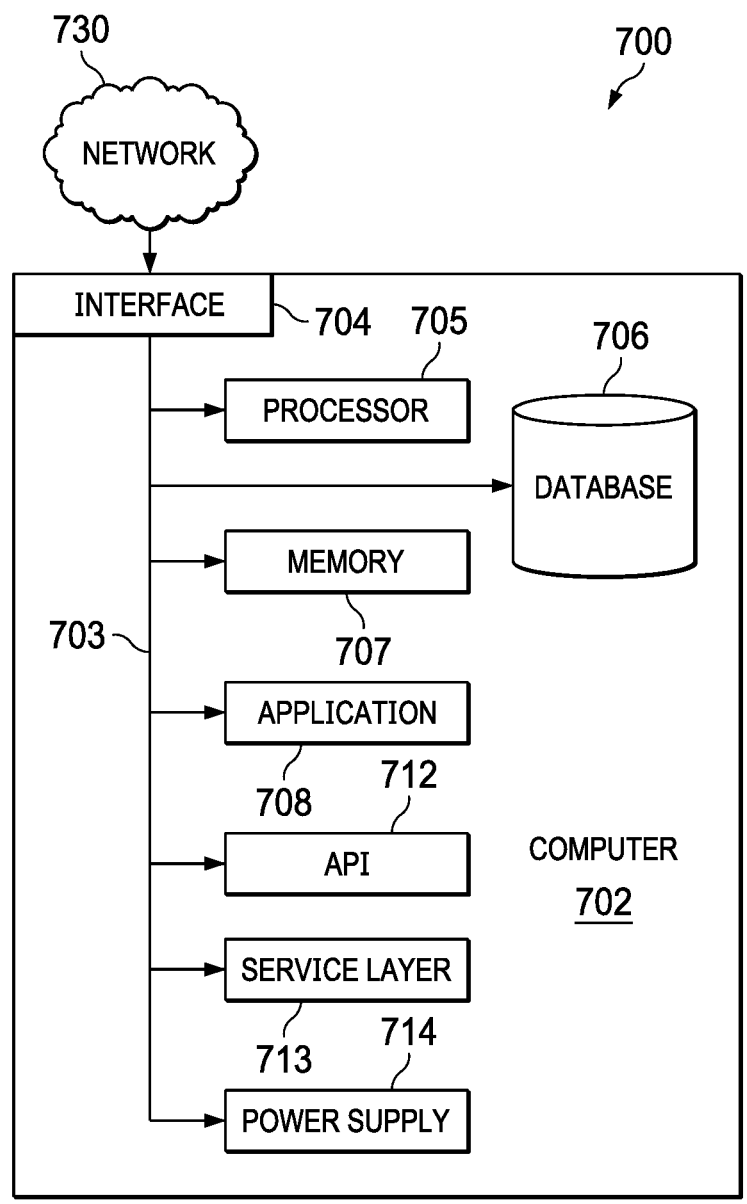
FIG. 7 is a block diagram illustrating an example computer system used to provide computational functionalities associated with described algorithms, methods, functions, processes, flows, and procedures as described in the present disclosure, according to some implementations of the present disclosure Like reference symbols in the various drawings indicate like elements.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality.

While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a computer-implemented method includes receiving a Brillouin scattering wave from at least one optical fiber extending into a fluid flow; determining a Brillouin frequency shift using heterodyne detection; determining strain and temperature values at one or more locations along the optical fiber; determining a flow regime of the fluid flow using a flow regime observer; and determining the different components of the fluid flow using a quantifier based on the determined strain and temperature values and the determined flow regime.

The foregoing and other described implementations can each, optionally, include one or more of the following features:

A first feature, combinable with any of the following features, the method further including: directing a portion of the laser beam through an electro-optic modulator and controlling the electro-optic modulator with a microwave signal generator to generate the local oscillator having a frequency corresponding to a frequency generated by the microwave signal generator.

A second feature, combinable with any of the previous or following features, wherein receiving a Brillouin scattering wave from at least one optical fiber extending into a fluid flow includes receiving backscattering from a laser beam transmitted along the optical fiber, the backscattering produced by a grating formed by zinc dicyanoaurate in the optical fiber.

A third feature, combinable with any of the previous or following features, wherein determining a Brillouin frequency shift using heterodyne detection includes comparing a local oscillator signal to the Brillouin scattered wave using a first photodiode.

A fourth feature, combinable with any of the previous or following features, wherein determining a Brillouin frequency shift using heterodyne detection further includes: comparing the local oscillator signal to the Brillouin scattered wave using a second photodiode and summing a first electrical signal from the first photodiode and a second electoral signal from the second photodiode using a summation amplifier.

A fifth feature, combinable with any of the previous or following features, wherein determining strain and temperature values at one or more locations along the optical fiber includes correlating the Brillouin frequency shift with a position along the optical fiber to determine the stress and temperature values at the position along the optical fiber.

A sixth feature, combinable with any of the previous or following features, the method further including directing a portion of the laser beam through an electro-optic modulator and controlling the electro-optic modulator with a microwave signal generator to generate the local oscillator having a frequency corresponding to a frequency generated by the microwave signal generator.

In a second implementation, an apparatus for automatically detecting flow rates for different components of a fluid flow includes one or more processors; and a non-transitory computer-readable storage medium coupled to the one or more processors and storing programming instructions for execution by the one or more processors. The programming instructions are operable to instruct the one or more processors to generate a laser beam with a continuous wave laser; generate a local oscillator signal from a portion of the laser beam with an electro-optic modular; detect a Brillouin frequency shift with a photodiode according to heterodyne detection based on a comparison of a Brillouin scattered wave and the local oscillator signal; determine strain and temperature values at one or more locations along the optical fiber using one or more interrogators; determine a flow regime of the fluid flow using a flow regime observer; and determine the different components of the fluid flow using a quantifier based on the determined strain and temperature values and the determined flow regime.

The foregoing and other described implementations can each, optionally, include one or more of the following features:

A first feature, combinable with any of the following features, wherein the Brillouin scattered wave includes backscattering from a portion of the laser beam transmitted along an optical fiber exposed to the fluid flow, the backscattering produced by a grating formed by zinc dicyanoaurate in the optical fiber.

A second feature, combinable with any of the previous or following features, the apparatus further including a flowmeter including a plurality of optical fibers extending across a fluid flow, at least a portion of the optical fibers disposed parallel to each other and perpendicularly to a direction of the fluid flow.

A third feature, combinable with any of the previous or following features, the apparatus further including programming instructions that instruct the one or more processors to: compare the local oscillator signal to the Brillouin scattered wave using a second photodiode; and sum a first electrical signal from the first photodiode and a second electoral signal from the second photodiode using a summation amplifier.

A fourth feature, combinable with any of the previous or following features, wherein programming instructions that instruct the one or more processors to detect a Brillouin frequency shift with a photodiode according to heterodyne detection based on a comparison of a Brillouin scattered wave and the local oscillator signal include programming instructions that instruct the one or more processors to: compare the Brillouin scattered wave and the local oscillator signal with a first photodiode; compare the Brillouin scattered wave and the local oscillator signal with a second photodiode; and sum a first electrical signal from the first photodiode and a second electrical signal from the second photodiode with a summation amplifier.

A fifth feature, combinable with any of the previous or following features, wherein programming instructions that instruct the one or more processors to determine strain and temperature values at one or more locations along the optical fiber using one or more interrogators circuits include programming instructions that instruct the one or more processors to correlate the Brillouin frequency shift with a position along the optical fiber to determine the stress and temperature values at the position along the optical fiber.

A sixth feature, combinable with any of the previous or following features, further including programming instructions that instruct the one or more processors to smooth the determined strain and temperature values using one or more Kalman filters.

A seventh feature, combinable with any of the previous or following features, wherein the programming instructions that instruct the one or more processors to determine a flow regime of the fluid flow using a flow regime observer include programming instructions that instruct the one or more processors to determine the flow regime using artificial intelligence.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the present disclosure have been described. Nevertheless, it will be understood that various modifications may be made without departing from the spirit and scope of the present disclosure. For example, the number of optical fibers included in a flow meter may be oriented in one, two, or more different directions measured in a plane perpendicular to a direction of fluid flow. Accordingly, other embodiments are within the scope of the following claims.

What is claimed is:

1. A system for sensing strain and temperature at different locations along an optical fiber using a Brillouin frequency shift, the system comprising:
    a flowmeter comprising a plurality of optical fibers, the optical fibers comprising a core and a grating formed of zinc dicyanoaurate distributed within the core;
    a continuous wave laser operable to generate a laser beam, the laser beam entering a first end of the optical fibers, the laser beam being scattered to create a Brillouin scattered wave from a portion of the laser beam;
    an electo-optic modulator operable to generate a local oscillator;
    a heterodyne detector operable to receive the Brillouin scattered wave and the local oscillator and to compare the Brillouin scattered wave to the local oscillator to generate a Brillouin frequency shift; and
    an artificial intelligence system in electronic communication with the heterodyne detector and operable to determine volumetric flow rates of a fluid flow passing through the flow meter based on the Brillouin frequency shift.

2. The system of claim 1, wherein the artificial intelligence system comprises:
    at least one interrogator operable to determine a strain and measurement at one or more locations along a length of the optical fibers from the Brillouin frequency shift;
    a Kalman filter operable to smooth the determined strain and temperature measurements; and
    a quantifier operable to determine volumetric flow rates of components of a fluid flow passing through the flowmeter.

3. The system of claim 1, wherein the plurality of optical fibers comprises a first set of parallel optical fibers extending perpendicularly to a flow direction of the fluid flow.

4. The system of claim 1, wherein the plurality of optical fibers comprises a second set of parallel optical fibers disposed perpendicularly to the flow direction of the fluid flow and perpendicularly to the first set of parallel optical fibers.

5. The system of claim 1, wherein the first set of parallel optical fibers are displaced from the second set of parallel optical fibers in a direction of the fluid flow.

6. The system of claim 1, wherein the heterodyne detector comprises a first photodiode and a second photodiode and a summation amplifier operable to determine a phase shift between the local oscillator and the Brillouin scattered wave.

7. A computer implemented method performed by one or more processors for automatically detecting flow rates for different components of a fluid flow, the method comprising the following operations:
  receiving a Brillouin scattering wave from at least one optical fiber extending into a fluid flow, the Brillouin scattering wave generated by a photodetector;
  determining a Brillouin frequency shift using heterodyne detection;
  determining strain and temperature values at one or more locations along the optical fiber;
  determining a flow regime of the fluid flow using a flow regime observer; and
  determining the different components of the fluid flow using a quantifier based on the determined strain and temperature values and the determined flow regime.

8. The computer implemented method of claim 7, wherein receiving a Brillouin scattering wave from at least one optical fiber extending into a fluid flow comprises receiving backscattering from a laser beam transmitted along the optical fiber, the backscattering produced by a grating formed by zinc dicyanoaurate in the optical fiber.

9. The computer implemented method of claim 7, wherein determining a Brillouin frequency shift using heterodyne detection comprises comparing a local oscillator signal to the Brillouin scattered wave using a first photodiode.

10. The computer implemented method of claim 9, wherein determining a Brillouin frequency shift using heterodyne detection further comprises:
  comparing the local oscillator signal to the Brillouin scattered wave using a second photodiode; and
  summing a first electrical signal from the first photodiode and a second electoral signal from the second photodiode using a summation amplifier.

11. The computer implemented method of claim 7, wherein determining strain and temperature values at one or more locations along the optical fiber comprises correlating the Brillouin frequency shift with a position along the optical fiber to determine the stress and temperature values at the position along the optical fiber.

12. The computer implemented method of claim 7, further comprising:
  directing a portion of the laser beam through an electro-optic modulator; and
  controlling the electro-optic modulator with a microwave signal generator to generate the local oscillator having a frequency corresponding to a frequency generated by the microwave signal generator.

13. An apparatus for automatically detecting flow rates for different components of a fluid flow, the apparatus comprising:
  one or more processors; and
  a non-transitory computer-readable storage medium coupled to the one or more processors and storing programming instructions for execution by the one or more processors, the programming instructions instruct the one or more processors to:
  generate a laser beam with a continuous wave laser;
  generate a local oscillator signal from a portion of the laser beam with an electro-optic modular;
  detect a Brillouin frequency shift with a photodiode according to heterodyne detection based on a comparison of a Brillouin scattered wave and the local oscillator signal;
  determine strain and temperature values at one or more locations along the optical fiber using one or more interrogators;
  determine a flow regime of the fluid flow using a flow regime observer; and
  determine the different components of the fluid flow using a quantifier based on the determined strain and temperature values and the determined flow regime.

14. The apparatus of claim 13, wherein the Brillouin scattered wave comprises backscattering from a portion of the laser beam transmitted along an optical fiber exposed to the fluid flow, the backscattering produced by a grating formed by zinc dicyanoaurate in the optical fiber.

15. The apparatus of claim 13, further comprising a flowmeter comprising a plurality of optical fibers extending across a fluid flow, at least a portion of the optical fibers disposed parallel to each other and perpendicular to a direction of the fluid flow.

16. The apparatus of claim 13, further comprising programming instructions that instruct the one or more processors to:
  compare the local oscillator signal to the Brillouin scattered wave using a second photodiode; and
  sum a first electrical signal from the first photodiode and a second electoral signal from the second photodiode using a summation amplifier.

17. The apparatus of claim 13, wherein programming instructions that instruct the one or more processors to detect a Brillouin frequency shift with a photodiode according to heterodyne detection based on a comparison of a Brillouin scattered wave and the local oscillator signal comprises programming instructions that instruct the one or more processors to:
  compare the Brillouin scattered wave and the local oscillator signal with a first photodiode;
  compare the Brillouin scattered wave and the local oscillator signal with a second photodiode; and
  sum a first electrical signal from the first photodiode and a second electrical signal from the second photodiode with a summation amplifier.

18. The apparatus of claim 13, wherein programming instructions that instruct the one or more processors to determine strain and temperature values at one or more locations along the optical fiber using one or more interrogators comprises programming instructions that instruct the one or more processors to correlate the Brillouin frequency shift with a position along the optical fiber to determine the stress and temperature values at the position along the optical fiber.

19. The apparatus of claim 13, further comprising programming instructions that instruct the one or more processors to smooth the determined strain and temperature values using one or more Kalman filters.

20. The apparatus of claim 13, wherein the programming instructions that instruct the one or more processors to determine a flow regime of the fluid flow using a flow regime observer comprises programming instructions that instruct the one or more processors to determine the flow regime using artificial intelligence.

* * * * *

UNITED STATES PATENT AND TRADEMARK OFFICE
CERTIFICATE OF CORRECTION

PATENT NO. : 11,079,260 B2
APPLICATION NO. : 16/452153
DATED : August 3, 2021
INVENTOR(S) : Karam Chand and Frode Hveding It is certified that error appears in the above-identified patent and that said Letters Patent is hereby corrected as shown below:

In the Claims

Column 20, Line 42, Claim 1, delete "electo-optic" and insert -- electro-optic --.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*